United States Patent
Yamamoto et al.

(10) Patent No.: US 12,175,021 B2
(45) Date of Patent: Dec. 24, 2024

(54) DISPLAY SYSTEM

(71) Applicant: DENSO CORPORATION, Kariya (JP)

(72) Inventors: Takeshi Yamamoto, Kariya (JP); Shizuka Yokoyama, Kariya (JP); Kiyotaka Taguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/362,478

(22) Filed: Jul. 31, 2023

(65) Prior Publication Data
US 2023/0376123 A1 Nov. 23, 2023

Related U.S. Application Data

(63) Continuation of application No. PCT/JP2022/002837, filed on Jan. 26, 2022.

(30) Foreign Application Priority Data

Feb. 5, 2021 (JP) ................. 2021-017659

(51) Int. Cl.
*G06F 3/01* (2006.01)
*B60R 1/22* (2022.01)
(Continued)

(52) U.S. Cl.
CPC .............. *G06F 3/017* (2013.01); *G06F 3/013* (2013.01); *G06F 3/0481* (2013.01);
(Continued)

(58) Field of Classification Search
CPC .... G06F 1/3265; G06F 1/3278; G06F 1/3231; G06F 3/017; G06F 3/013; G06F 3/0481;
(Continued)

(56) References Cited

U.S. PATENT DOCUMENTS 9,552,058 B2 * 1/2017 Shibata ..................... G06F 3/01
9,662,980 B2 * 5/2017 Izumi ...................... G06F 3/017
(Continued)

FOREIGN PATENT DOCUMENTS

JP 2007215046 A 8/2007
JP 2018103646 A 7/2018
(Continued)

*Primary Examiner* — David Tung
(74) *Attorney, Agent, or Firm* — Harness, Dickey & Pierce, P.L.C.

(57) ABSTRACT

A display system changes display in accordance with a gesture of an operator in a vehicle. The display system includes a gesture detector that detects the gesture, a vision area detector that detects a vision area of the operator, a display that displays a gesture operation result that is an operation result of the gesture, and a display controller that executes a control related to display processing of the display. The display controller acquires the vision area detected by the vision area detector and a display area of the display, determines a positional relationship between the vision area and the display area, and displays the gesture operation result to the operator. The display controller determines a display mode of the gesture operation result based on the positional relationship between the vision area and the display area.

10 Claims, 9 Drawing Sheets

(51) Int. Cl.
*G06F 3/0481* (2022.01)
*G06F 3/0488* (2022.01)

(52) U.S. Cl.
CPC .............. *G06F 3/0488* (2013.01); *B60R 1/22* (2022.01); *B60R 2300/8046* (2013.01)

(58) Field of Classification Search
CPC ...... G06F 3/0488; G06F 3/0304; G06F 3/167; B60R 1/22; B60R 11/02; B60R 2300/8046
See application file for complete search history.

(56) References Cited

U.S. PATENT DOCUMENTS

| | | | | |
|---|---|---|---|---|
| 10,466,800 | B2* | 11/2019 | Matsubara | B60K 35/10 |
| 10,528,150 | B2* | 1/2020 | Mori | G06F 3/04817 |
| 10,654,489 | B2* | 5/2020 | Tertoolen | G08G 1/166 |
| 11,853,469 | B2* | 12/2023 | Wieczorek | G09G 3/001 |
| 2010/0238280 | A1* | 9/2010 | Ishii | B60K 35/10 |
| | | | | 348/77 |
| 2016/0004321 | A1* | 1/2016 | Takada | B60K 35/10 |
| | | | | 345/156 |
| 2017/0305342 | A1* | 10/2017 | Tomioka | G08G 1/16 |
| 2019/0236343 | A1* | 8/2019 | Konishi | G06V 40/20 |
| 2021/0072943 | A1 | 3/2021 | Enokida et al. | |

FOREIGN PATENT DOCUMENTS

| | | | |
|---|---|---|---|
| JP | 2019202723 A | 11/2019 | |
| JP | 2020067713 A | 4/2020 | |

\* cited by examiner

DISPLAY SYSTEM

CROSS REFERENCE TO RELATED APPLICATIONS

The present application is a continuation application of International Patent Application No. PCT/JP2022/002837 filed on Jan. 26, 2022, which designated the U.S. and claims the benefit of priority from Japanese Patent Application No. 2021-017659 filed on Feb. 5, 2021. The entire disclosures of all of the above applications are incorporated herein by reference.

TECHNICAL FIELD

The present disclosure relates to a display system.

BACKGROUND

A vehicle information display device displays feedback information that is information in response to recognition of a gesture input.

SUMMARY

According to at least one embodiment of the disclosure, a display system changes display in accordance with a gesture of an operator in a vehicle. The display system includes a gesture detector configured to detect the gesture, a vision area detector configured to detect a vision area of the operator, a display configured to display a gesture operation result that is an operation result of the gesture, and a display controller configured to execute a control related to display processing of the display. The display controller includes an area acquisition unit configured to acquire the vision area detected by the vision area detector and a display area of the display, a position determination unit configured to determine a positional relationship between the vision area and the display area, and a display execution unit configured to display the gesture operation result to the operator. The display execution unit determines a display mode of the gesture operation result based on the positional relationship between the vision area and the display area.

DETAILED DESCRIPTION

Figure 1:
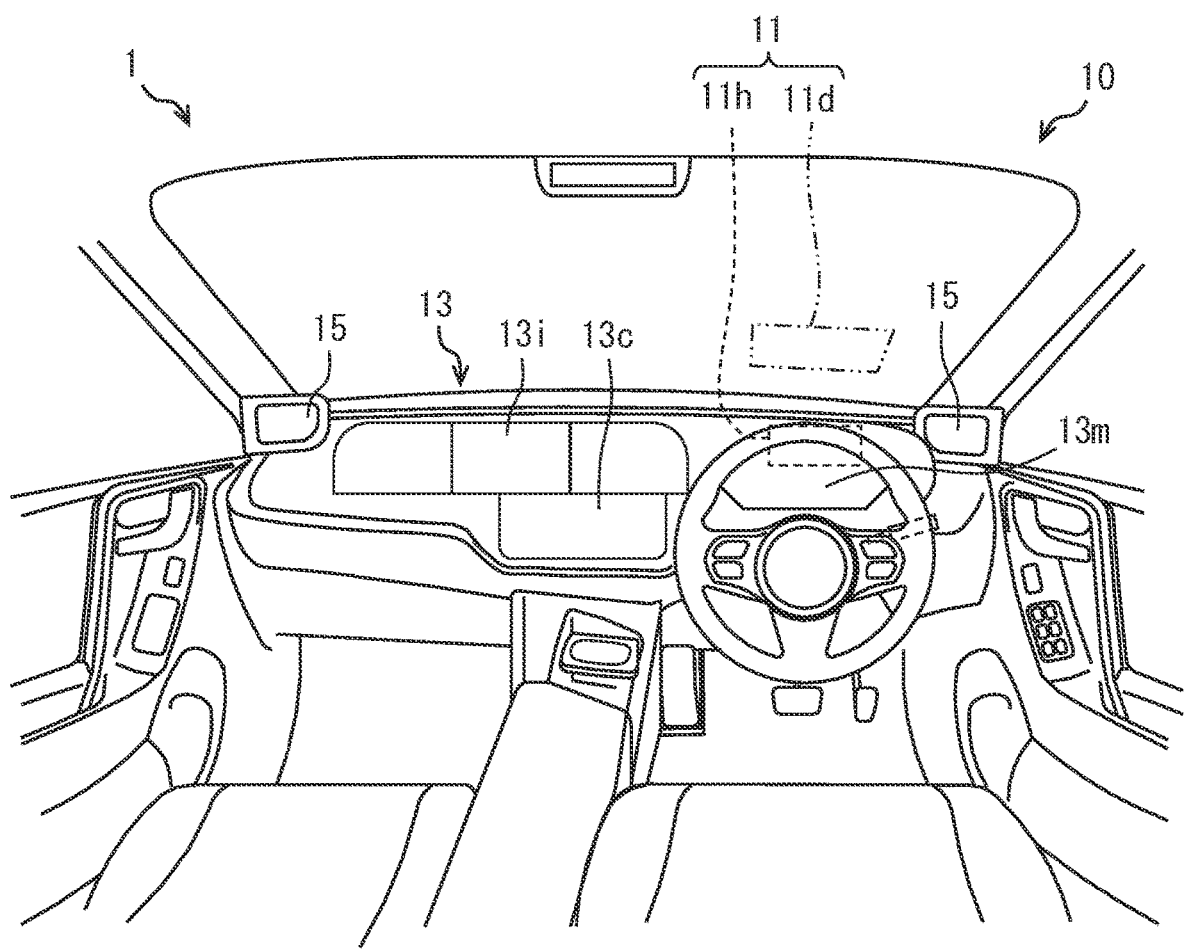
FIG. 1 is a diagram illustrating an arrangement of a display.

A comparative example will be described first. A vehicle information display device according to the comparative example displays feedback information that is information in response to recognition of a gesture input. The disclosure of JP 2018-103646 A is incorporated herein by reference to explain technical elements presented herein.

In the configuration of the comparative example, the feedback information is displayed at different positions on a head-up display according to a driving situation. Accordingly, a driver can concentrate on driving during vehicle traveling, while visibility of the feedback information is enhanced during vehicle stopping. However, an operator performing a gesture does not always look an area including the head-up display. If the driver does not look the head-up display, the driver who has performed the gesture cannot confirm the feedback information. Therefore, when an operation result is different from an intention of the operator who has performed the gesture, the operator may be difficult to notice that the operation is different from his or her intention.

In contrast to the comparative example, according to the present disclosure, a display system can display an operation result of a gesture to be easily recognizable.

According to an aspect of the disclosure, a display system changes display in accordance with a gesture of an operator in a vehicle. The display system includes a gesture detector configured to detect the gesture, a vision area detector configured to detect a vision area of the operator, a display configured to display a gesture operation result that is an operation result of the gesture, and a display controller configured to execute a control related to display processing of the display. The display controller includes an area acquisition unit configured to acquire the vision area detected by the vision area detector and a display area of the display, a position determination unit configured to determine a positional relationship between the vision area and the display area, and a display execution unit configured to display the gesture operation result to the operator. The display execution unit determines a display mode of the gesture operation result based on the positional relationship between the vision area and the display area.

According to the display system, the display execution unit determines the display mode of the gesture operation result based on the positional relationship between the vision area and the display area. Therefore, the display mode of the gesture operation result can be changed in accordance with the position of the vision area that may change depending on the state of the operator. Therefore, according to the display system, an operation result of the gesture can be easily checked.

According to an aspect of the disclosure, a method is used for a display system configured to change display of a display in accordance with a gesture of an operator detected by a gesture detector. The method includes acquiring a vision area of the operator detected by a vision area detector and a display area of the display capable of displaying a gesture operation result which is an operation result of the gesture, determining a positional relationship between the vision area and the display area, and displaying the gesture operation result to the operator. The displaying includes determining a display mode of the gesture operation result based on the positional relationship between the vision area and the display area.

According to the method, the display mode of the gesture operation result is determined based on the positional relationship between the vision area and the display area. Therefore, the display mode of the gesture operation result can be changed in accordance with the position of the vision area that may change depending on the state of the operator.

Therefore, according to the method, an operation result of the gesture can be easily checked.

Hereinafter, embodiments will be described with reference to the drawings. In the embodiments, parts that functionally and/or structurally correspond to or are associated with each other may be assigned the same reference numeral, or reference numerals different in digit in the hundreds or higher place. With respect to the parts that correspond to or are associated with each other, explanations thereof can be shared among the embodiments.

First Embodiment

In FIG. 1, a display 10 constituting a display system 1 is mounted on a vehicle. The display system 1 provides various types of information to an occupant by displaying information related to traveling of a vehicle, information for providing entertainment, for example. However, the display system 1 is configured to use not only visual information but also non-visual information such as audio information. The display system 1 is configured to use visual information and non-visual information in combination. A display mode includes various items such as a content to be displayed on the display system 1, a display position of the content, and a display timing of the content. Therefore, determining the display mode can mean determining each of the items such as the content to be displayed.

The display 10 includes a head-up display 11, a display unit 13, and electronic mirrors 15. However, the display 10 does not need to include all the devices described above, and may include other devices not described above.

The head-up display 11 displays a virtual image superimposed on a front window. The head-up display 11 includes a body portion 11h and a display portion 11d. The head-up display 11 executes necessary display by projecting an image from the body portion 11h toward the display portion 11d.

The head-up display 11 mainly executes display for making the driver aware of information related to vehicle traveling. For example, a route guidance display, a warning display, or the like is displayed on the head-up display 11 as necessary. The display of the head-up display 11 can be recognized by the driver even in a situation in which the driver is looking ahead to drive the vehicle. The display portion 11d of the head-up display 11 is provided at a position in front of the driver's seat. The head-up display 11 provides an example of a small display.

The display unit 13 displays necessary information mainly to an occupant seated in a front seat of the vehicle. The display unit 13 includes, for example, a liquid crystal display or an organic electroluminescent display. The display unit 13 has a wider displayable area and higher resolution than the head-up display 11. Therefore, the display unit 13 can widely display a finer image than the head-up display 11. Therefore, the display unit 13 is capable of displaying more information than the head-up display 11. The display unit 13 provides an example of a large display.

The display unit 13 is provided on an instrument panel of the vehicle. Therefore, the display unit 13 can be provided at a position lower than the display portion 11d of the head-up display 11. The display unit 13 extends along a right-left direction of the instrument panel, and is provided to be horizontally long so as to include a position in front of the driver's seat and a position in front of the passenger's seat.

The display unit 13 includes display screens and can simultaneously display multiple pieces of information of different types. The display unit 13 displays information related to a state of the vehicle, such as vehicle speed, a remaining fuel amount, and a remaining battery amount. The display unit 13 includes a meter display 13m on which information about the state of the vehicle is displayed. The meter display 13m is provided in a region of the instrument panel located frontward of a steering wheel.

The display unit 13 displays, for example, information such as route guidance related to a car navigation device and reproduced moving images of video contents. The display unit 13 includes infotainment display 13i on which information such as route guidance is displayed. The infotainment display 13i can also be a device that provides information and entertainment to an occupant. The infotainment display 13i is provided mainly at a position in front of the passenger seat in the instrument panel.

The display unit 13 displays, for example, information on a state of an air conditioner, a state of an audio device, or the like. The display unit 13 includes a center information display 13c on which information on the state of the air conditioner or the like is displayed. The center information display 13c is provided in a center cluster of the instrument panel.

The center information display 13c displays information that can be changed by an operation of the occupant. The information that can be changed by the operation of the occupant is, for example, information such as a set temperature of air conditioning, a set air volume of the air conditioning, and a volume of the audio device.

The center information display 13c includes a touch panel. Therefore, the center information display 13c has two functions. One is a function of displaying information, and the other is a function of receiving an operation from the occupant. In other words, the center information display 13c functions not only as the display 10 but also as a gesture detector 53 described later. The touch panel of the center information display 13c detects a gesture as a motion of the occupant performed in a state of being in contact with the panel. Examples of specific gestures will be described later.

The touch panel of the center information display 13c can also accept operations other than gestures. For example, an operation can also be accepted by pressing an operation button on the touch panel. The center information display 13c may also be an operation display for receiving an operation by the occupant. On the other hand, the meter display 13m and the infotainment display 13i may be display-only displays that executes display only.

The gesture detectable by the center information display 13c is not limited to an operation involving contact with the touch panel. For example, the center information display 13c may include an optical sensor that detects reflected light or transmitted light of projected light, and may detect a gesture from a change in light due to a motion of the occupant. For example, the center information display 13c may include a capacitance sensor that detects capacitance, and may detect a gesture from a change in capacitance due to a motion of the occupant. Therefore, the center information display 13c may adopt a configuration in which a contactless operation not involving contact with the center information display 13c is detected as a gesture.

The meter display 13m and the infotainment display 13i are next to each other in the right-left direction. A display screen for displaying information such as current time and weather may be provided between the meter display 13m and the infotainment display 13i. The infotainment display 13i and the center information display 13c are next to each other in the up-down direction. The center information display 13c is provided below the infotainment display 13i. Therefore, when operating the center information display 13c with a finger, the occupant does not block the display screen of the infotainment display 13i with his or her hand or finger.

The display unit 13 is a pillar-to-pillar type display extending from an edge adjacent to a base of a left A-pillar to an edge adjacent to a base of a right A-pillar. The display unit 13 is formed by one display in which multiple display screens showing different display contents are continuous without a seam. In other words, a part of the one continuous display functions as the meter display 13m, another part functions as the infotainment display 13i, and another part functions as the center information display 13c. In the display unit 13, it is possible to arbitrarily set what content is displayed and where the content is displayed. For example, a portion functioning as the center information display 13c may be positioned in a front area of the front passenger seat instead of the center cluster of the instrument panel.

The display unit 13 is not limited to a case of being formed by the one continuous display. For example, the display unit 13 may be formed as a whole by multiple displays arranged on the instrument panel so as to be separated from each other.

The electronic mirrors 15 function as a rearview mirror and shows an image captured by a camera device on a display instead of reflecting light on a mirror attached to a vehicle. The electronic mirrors 15 functioning as left and right mirrors take images in respective views of left and right rear sides of the vehicle with the camera device and displays the images on the displays. The electronic mirrors 15 may be a periphery monitoring device for monitoring the periphery of the vehicle.

The electronic mirrors 15 are formed by displays separate from the display unit 13. However, the electronic mirrors 15 may be formed as a display integrated with the display unit 13.

The display portion 11d of the head-up display 11 provides an example of a display area. The display screen of the display unit 13 provides an example of the display area. The display screens of the electronic mirrors 15 provide an example of the display area. In summary, the display area includes the display portion 11d and the multiple display screens.

Figure 2:
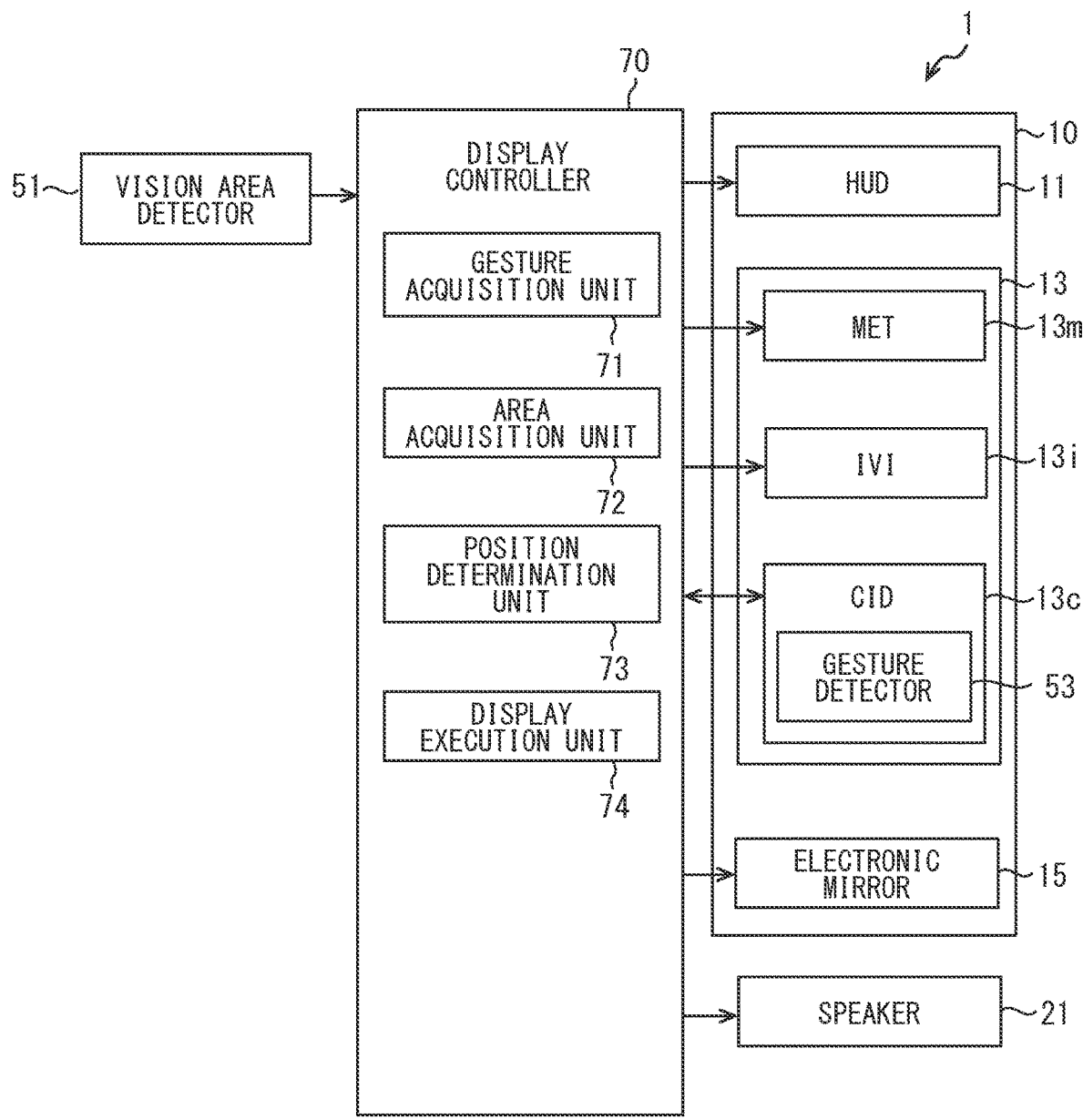
FIG. 2 is a block diagram related to control of a display system.

In FIG. 2, the display system 1 includes the display 10 and a display controller 70. The display controller 70 is connected to a vision area detector 51. The vision area detector 51 detects a vision area VA which is an area visually recognized by an operator such as a driver of the vehicle. Hereinafter, a case where the operator is the driver of the vehicle will be described as an example. However, an occupant other than the driver may be set as the operator. The vision area detector 51 is, for example, an in-vehicle camera that captures an image of the inside of the vehicle including the eyes of the driver. The vision area detector 51 functions as a device for grasping a state of the driver, that is, functions as a line-of-sight detection sensor of a driver status monitor.

Figure 3:
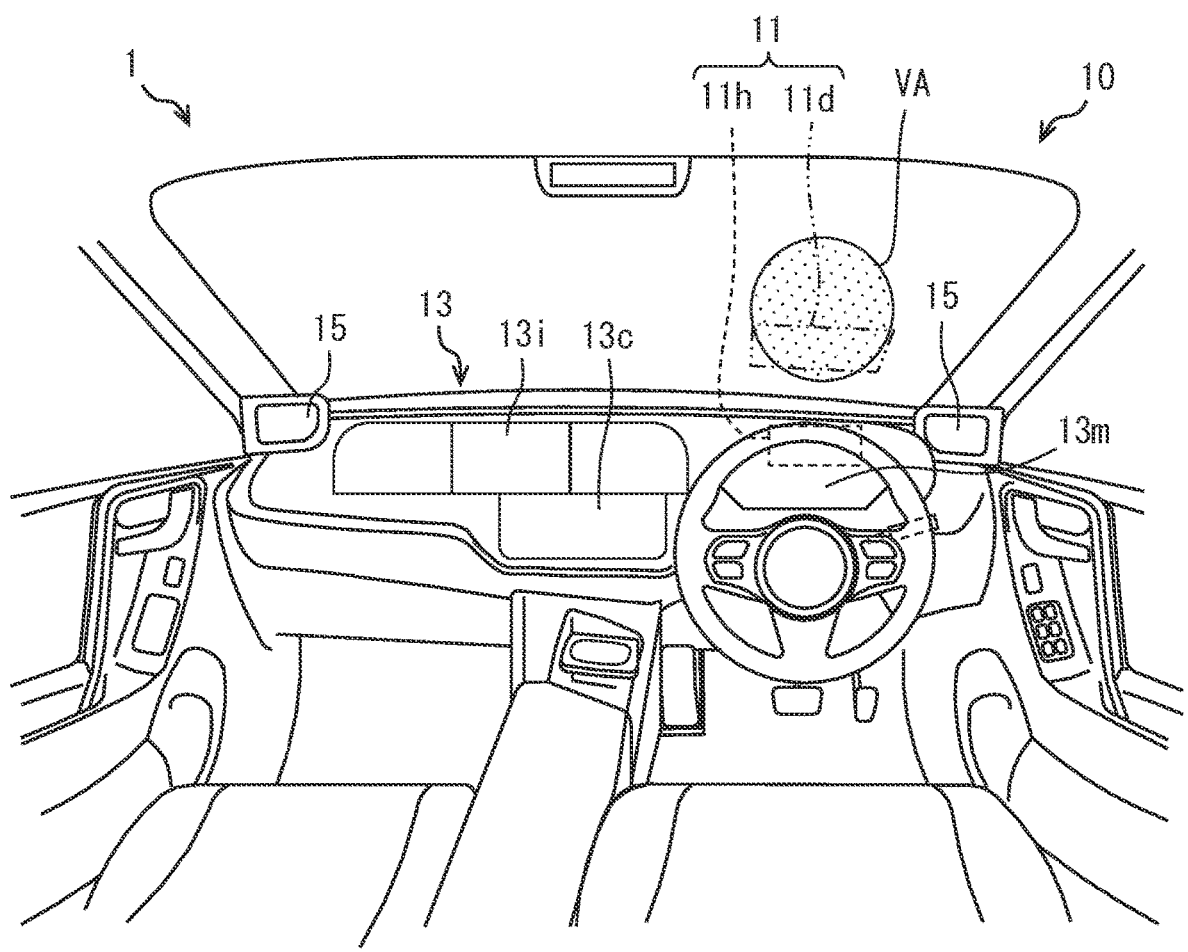
FIG. 3 is a diagram illustrating a vision area of a driver looking ahead.

The vision area VA of the driver looking ahead will be described with reference to FIG. 3. In the drawing, the vision area VA is indicated by dot hatching. The center position of the vision area VA is located above the display portion 11d of the head-up display 11. The center position of the vision area VA can also be referred to as a line-of-sight position. The vision area VA includes the display portion 11d of the head-up display 11. Therefore, the driver can check the content displayed on the display portion 11d of the head-up display 11 while looking ahead. The vision area VA does not include a display area other than the display portion 11d of the head-up display 11.

The vision area VA is formed in a substantially circular shape with the visual line-of-sight position as the center position. In addition, the vision area VA tends to become narrower as the vehicle speed increases. Therefore, the vision area detector 51 detects the position and the size of the vision area VA using information of the line-of-sight position and information of the vehicle speed.

In FIG. 2, the display controller 70 is connected to the display 10 including the head-up display 11, the display unit 13, and the electronic mirrors 15. The display controller 70 controls the display 10 to execute necessary display processing for the occupant. In the drawings, the meter display 13m is denoted as MET, the infotainment display 13i is denoted as IVI, and the center information display 13c is denoted as CID. Here, IVI is an abbreviation for In-Vehicle Infotainment. The display controller 70 may include a processor and a memory storing a program to be executed by the processor to achieve the display processing of the display 10.

The display controller 70 is connected to the gesture detector 53 of the center information display 13c. The gesture detector 53 detects a gesture as a touch operation of the occupant on the touch panel or an operation of the occupant on the non-contact sensor. The display controller 70 controls the gesture detector 53 to detect a gesture performed by the occupant.

The display controller 70 is connected to a speaker 21. The speaker 21 is a device capable of outputting sound into the vehicle. The speaker 21 is capable of outputting, to the inside of the vehicle, a sound that gives notification to the occupant, such as voice guidance in route guidance. In addition, the speaker 21 is capable of outputting, to the inside of the vehicle, a sound that provides amusement to the occupant, such as music or sound of video. The display controller 70 controls the speaker 21 to output sound to the inside of the vehicle.

The display controller 70 includes a gesture acquisition unit 71, an area acquisition unit 72, a position determination unit 73, and a display execution unit 74. The gesture acquisition unit 71 acquires a gesture detected by the gesture detector 53 as a gesture operation result. The gesture operation result is a result of a change made to an operation target device such as an air conditioner or an audio device by a gesture of the occupant. The gesture operation result is, for example, to lower the set temperature of cooling by 2° C. The gesture operation result is, for example, to set the volume of music to zero.

The area acquisition unit 72 acquires the vision area VA of the occupant detected by the vision area detector 51. The area acquisition unit 72 acquires the display area by recognizing the positions of the display portion 11d of the head-up display 11, the display screen of the display unit 13, and the display screens of the electronic mirrors 15. Information on the display area includes information on the positions of the display screen of the meter display 13m, the display screen of the infotainment display 13i, and the display screen of the center information display 13c on the display screen of the display unit 13.

The position determination unit 73 determines a positional relationship between the vision area VA and the display area acquired by the area acquisition unit 72. More specifically, it is determined whether the display area is included in the vision area VA. When even a part of the display area is included in the vision area VA, it is determined which display screen of the display 10 corresponds to the display area included in the vision area VA.

The display execution unit 74 executes a display control in which the gesture operation result is fed back as a gesture response to an operator who has performed a gesture. The display control includes a control in which display on the display 10 is executed and a control in which sound is output from the speaker 21.

Figure 4:
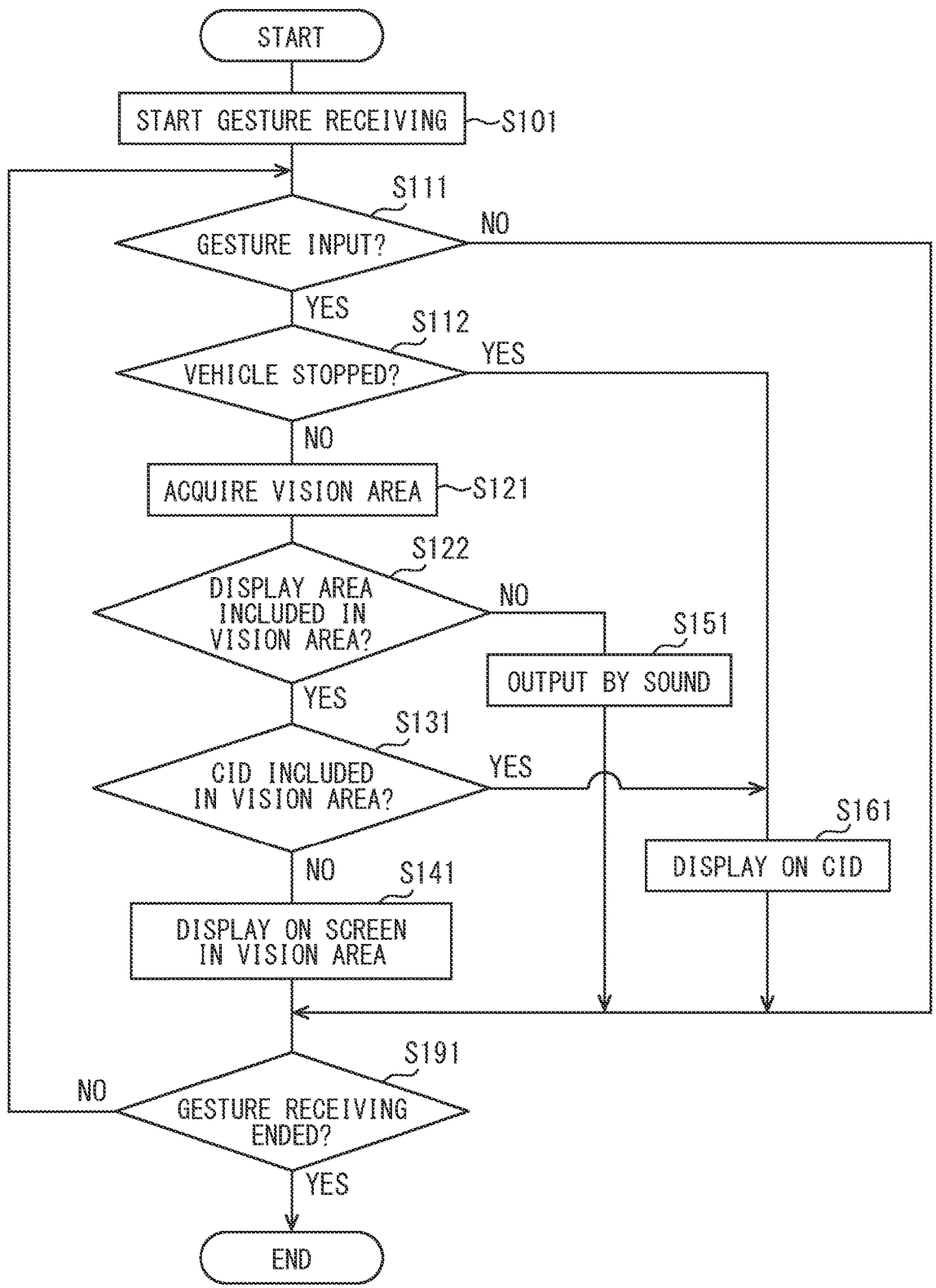
FIG. 4 is a flowchart illustrating the control of the display system.

A flow of the display control for a gesture will be described with reference to FIG. 4. The display control for a gesture is started when power is supplied to the vehicle, for example, when a power switch of the vehicle is turned on by an occupant. When the display control for a gesture is started, in step S101, the gesture detector 53 starts receiving a gesture performed by the occupant. After the receiving of the gesture is started, the control proceeds to step S111.

In step S111, the display controller 70 determines whether there is an input of a gesture by the occupant. Examples of the gesture include an operation of tracing the touch panel of the center information display 13c in the right-left direction, and an operation of tracing the touch panel in the up-down direction. In this case, different gestures can be set for respective items to be changed. For example, the operation of tracing the touch panel in the right-left direction may correspond to change in set air volume, and the operation of tracing the touch panel in the up-down direction may correspond to change in set temperature.

In addition, the number of times of the gesture or the range of the gesture may be linked to a magnitude of a degree of the change in set temperature or the like. For example, an operation of tracing the touch panel downward twice may be set as a gesture of lowering the set temperature of cooling by 2° C. For example, an operation of tracing the touch panel downward by 2 cm may be set as a gesture of lowering the set temperature of cooling by 2° C. When it is determined in step S111 that there is a gesture input, the control proceeds to step S112. On the other hand, when there is no gesture input at step S111, it is determined that there is no information to be displayed regarding a gesture, and the control proceeds to step S191.

In step S112, the display controller 70 determines whether the vehicle is stopped. Whether the vehicle is stopped can be determined from a gear shift position of the vehicle, a vehicle speed detected by a vehicle speed sensor, or the like. When the vehicle is determined not to be stopped, i.e., determined to be traveling at step S112, the control proceeds to step S121. On the other hand, when the vehicle is determined to be stopped at S112, it is determined that a necessity for the driver to look ahead is low, and the control proceeds to step S161.

Figure 5:
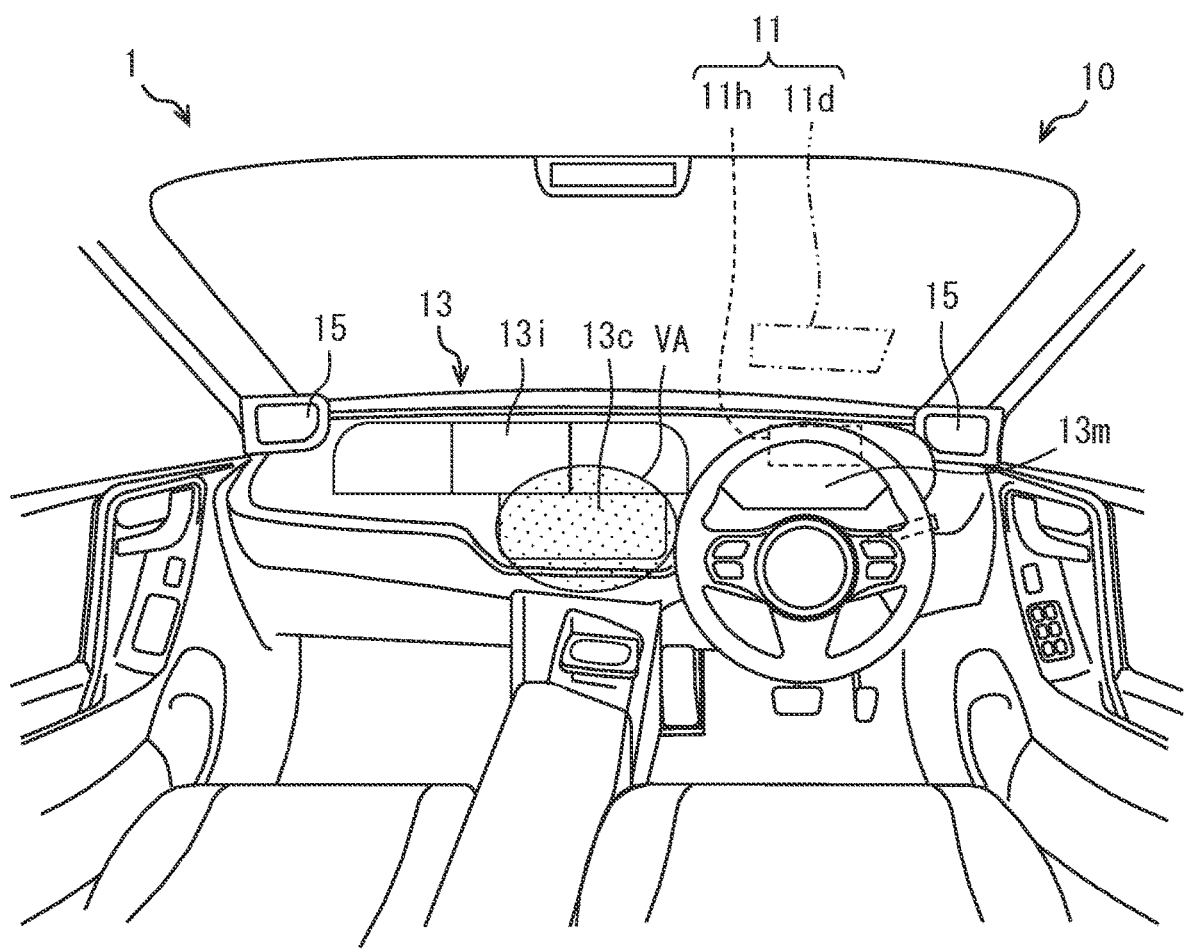
FIG. 5 is a diagram illustrating a vision area of the driver looking at a center information display.

In step S121, the area acquisition unit 72 acquires the vision area VA of the driver. FIG. 5 shows the vision area VA when the driver is gazing at the center information display 13c. The center position of the vision area VA is located on the display screen of the center information display 13c. The vision area VA includes not only the center information display 13c but also a part of the infotainment display 13i. The control in step S121 provides an example of an area acquisition step.

Figure 6:
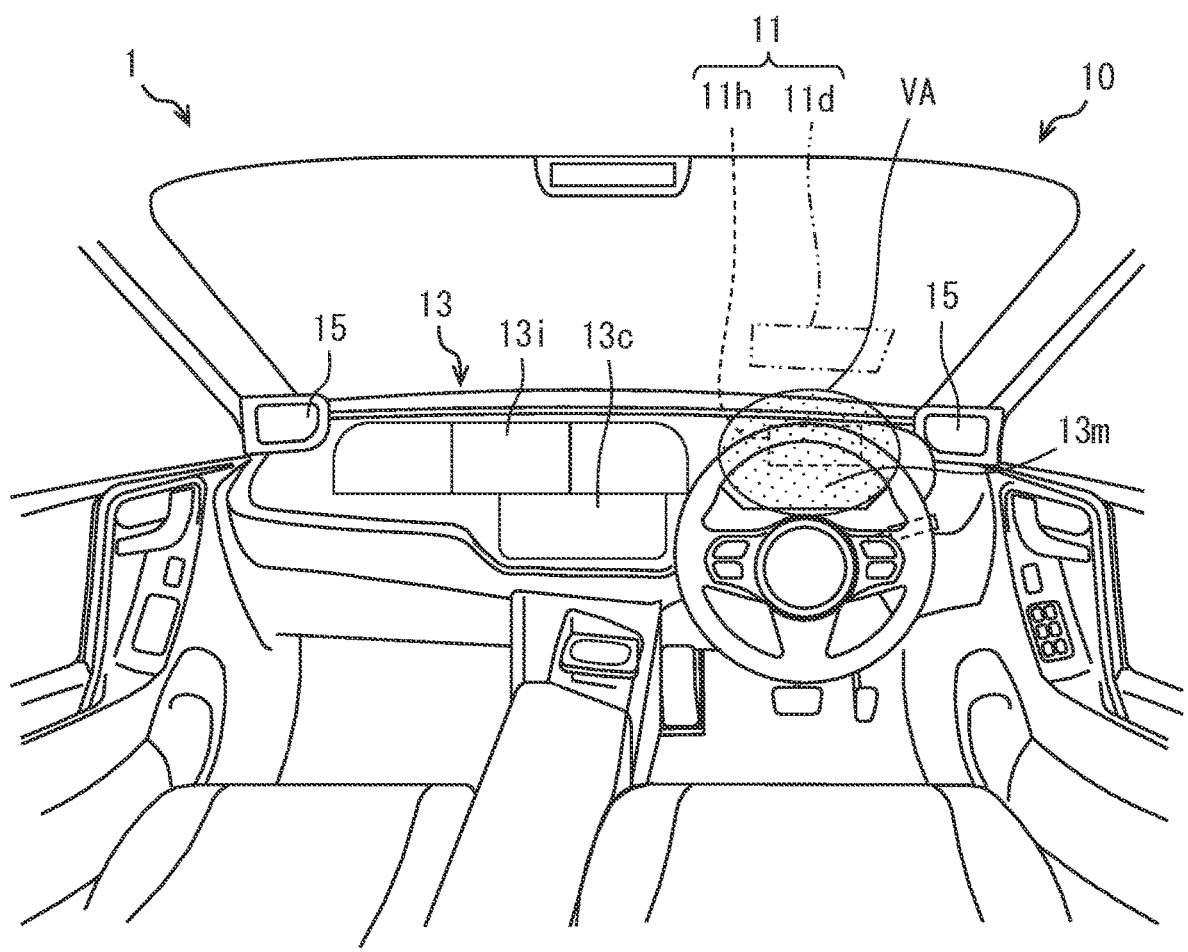
FIG. 6 is a diagram illustrating a vision area of the driver looking at a meter display.

FIG. 6 shows the vision area VA when the driver is gazing at the meter display 13m. The center position of the vision area VA is located on the display screen of the meter display 13m. The display area included in the vision area VA is only the display screen of the meter display 13m. The area acquisition unit 72 acquires the vision area VA and acquires the latest display area. After the vision area VA and the latest display area are acquired, the control proceeds to step S122.

In step S122, the position determination unit 73 determines whether the display area is included in the vision area VA. A situation in which the display area is not included in the vision area VA is assumed to be, for example, a situation in which the driver is gazing in the right-left direction for checking right and left sides of the vehicle. Alternatively, the situation in which the display area is not included in the vision area VA is assumed to be, for example, a situation in which the driver looks ahead without the display portion 11d of the head-up display 11 being not included in the vision area VA, for example, when looking up at a traffic light ahead. The control in step S122 provides an example of a position determination step.

When even a part of the display area is determined to be included in the vision area VA in step S122, the control proceeds to step S131. On the other hand, when the display area is determined not to be included in the vision area VA in step S122, it is determined that the driver cannot immediately visually recognize information displayed by the display 10, and the control proceeds to step S151.

In step S131, the position determination unit 73 determines whether the display screen of the center information display 13c is included in the vision area VA. When the center information display 13c is determined to be included in the vision area VA in step S131, the control proceeds to step S161. On the other hand, when the display screen of the center information display 13c is determined not to be included in the vision area VA in step S131, the control proceeds to step S141. The control of step S131 provides an example of a position determination step.

In step S141, the display execution unit 74 displays the gesture operation result on the display screen included in the vision area VA. For example, when the vision area VA is located on the display portion 11d of the head-up display 11, the gesture operation result is displayed on the display portion 11d. Here, the head-up display 11 is a device in which contents to be displayed for respective display sections in the display portion 11d are set in advance. For example, the route guidance display and the gesture operation result are displayed in different display sections in the display portion 11d. Therefore, the gesture operation result may be displayed in a display section dedicated for displaying the gesture operation result in the display portion 11d. The control of step S141 provides an example of a display execution step.

When the center position of the vision area VA is located on a center screen of the infotainment display 13i, the gesture operation result is displayed on the center screen of the infotainment display 13i instead of a left screen or a right screen of the infotainment display 13i. Here, the infotainment display 13i is a device capable of displaying arbitrary content at an arbitrary place on the display screen. Therefore, the gesture operation result is displayed in an area including the center position of the vision area VA in the center screen of the infotainment display 13i.

In the infotainment display 13i, a part of the display screen may be set in advance as a display section capable of displaying the gesture operation result. For example, a right display section may be provided in a part of the right screen, a left display section may be provided in a part of the left screen, and a center display section may be provided in a part of the center screen. In this case, the gesture operation result is displayed in a display section closest to the center position of the vision area VA among the right display section, the left display section, and the center display section provided apart from each other.

When the vision area VA is located on the display screen of the meter display 13m, the gesture operation result is displayed on the display screen of the meter display 13m. When the vision area VA is located on the display screen of one of the electronic mirrors 15, the gesture operation result is displayed on the display screen of the one of the electronic mirrors 15. At this time, the gesture operation result is displayed on the one of the electronic mirrors 15 included in the vision area VA, and the gesture operation result is not displayed on the other of the electronic mirrors 15 that is not included in the vision area VA.

When the gesture operation result is displayed on the display portion 11d of the head-up display 11, the gesture operation result is displayed as an icon to the driver. More specifically, the gesture operation result is displayed as an icon indicating that the setting of the operation target device has been changed by the gesture. The icon is simple and expresses information in an intuitively understandable manner. Accordingly, the driver can visually recognize the icon displayed on the display portion 11d of the head-up display 11 and recognize that the setting of the operation target device has been changed by the gesture.

When the gesture operation result is displayed on the infotainment display 13i, the gesture operation result is displayed in detail as a detailed information to the driver. The displayed detailed information has a larger amount of information than the icon. The displayed detailed information includes information on what content the setting of the operation target device has been changed to. For example, it is displayed that the set temperature of the cooling is lowered by 2° C. Alternatively, it is displayed that the set temperature after the change has been changed from 28° C. to 26° C. After the gesture operation result is displayed on the display screen in the vision area VA in step S141, the control proceeds to step S191.

In step S151, the display execution unit 74 outputs the gesture operation result by sound. For example, a fact that the set temperature of the cooling is lowered by 2° C. is output by voice from the speaker 21. Alternatively, a sound indicating that the set temperature has been changed from 28° C. to 26° C. is output from the speaker 21. Alternatively, only a change of the set temperature of the cooling is output from the speaker 21 as a notification sound. After outputting the gesture operation result by sound at S151, the control proceeds to step S191.

In step S161, the display execution unit 74 displays the gesture operation result on the center information display 13c. The center information display 13c displays detailed information instead of an icon. Here, the displayed detailed information may be different from the detailed information displayed on the infotainment display 13i. For example, as the detailed information displayed on the center information display 13c, only the final result changed by the gesture may be displayed. More specifically, it may be displayed that the set temperature of the cooling is 26° C. After the detailed information is displayed on the center information display 13c in step S161, the control proceeds to step S191. The control of the step S161 provides an example of a display execution step.

In step S191, the display controller 70 determines whether the receiving of the gesture has ended. For example, when the power switch of the vehicle is turned off, the gesture receiving has ended. When the receiving of the gesture has ended, it is determined that there is no possibility that a new gesture is input by the occupant, and the display control for the gesture ends. On the other hand, when the receiving of the gesture is maintained, it is determined that there is a possibility that a new gesture is input by the occupant, and the control returns to step S111 to repeat the series of display controls for the gesture.

The following will describe technical effects of the present embodiment. According to the embodiment described above, the display execution unit 74 determines a display mode of the gesture operation result based on the positional relationship between the vision area VA and the display area. Therefore, it is easy to appropriately respond to a gesture of the operator as compared with a case where display is always executed in the same manner regardless of the position of the vision area VA that may change depending on the situation of the operator. Therefore, it is easy for the operator to grasp whether the operation by the gesture is appropriately reflected in the control of the operation target device. Therefore, in the display system 1, the operation result of the gesture can be easily checked by the operator.

In particular, the gesture is an operation method that can be executed without looking at an operation screen or the like, and is considered to be an operation that is highly likely to be executed while the operator looking ahead. Therefore, if the gesture operation result is always displayed on the center information display 13c, it is necessary to check the gesture operation result at a timing at which the operator is unnecessary to look ahead, in other words, a timing at which the gesture operation result can be checked is limited. In addition, when the gesture operation result is always output as a sound, it may be difficult to hear the gesture operation result due to another sound, for example, during route guidance or near a railroad crossing. Therefore, an optimal display mode is automatically selected based on the positional relationship between the vision area VA and the display area, and then the gesture operation result is displayed. This automatic selection is useful when transmitting the gesture operation result to the driver of the vehicle who needs to look ahead.

When at least a part of the display area is included in the vision area VA (YES in step S122), the display execution unit 74 displays the gesture operation result in the display area within the vision area VA. On the other hand, when the display area is not included in the vision area VA (NO in step S122), the gesture operation result is not displayed in the display area. Therefore, it is easy to reduce a frequency of occurrence of a situation in which the displayed gesture operation result is not visually recognized by the operator. In addition, it is possible to reduce a frequency of display of the gesture operation result in a situation where the operator cannot immediately visually recognize the display.

The display execution unit 74 displays the gesture operation result at a position including the center position of the vision area VA. Therefore, it is possible to display the gesture operation result at a position that is particularly easy to be visually recognized in the vision area VA.

The display execution unit 74 displays the gesture operation result in a display section located at a position closest to the center position of the vision area VA among the display sections. Therefore, it is possible to display the gesture operation result at a position that is particularly easy to be visually recognized among the display sections.

The gesture operation result displayed on the head-up display 11 is different from the gesture operation result displayed on the display unit 13. In other words, the display execution unit 74 displays different contents between the case of displaying the gesture operation result on the small display and the case of displaying the gesture operation result on the large display. Therefore, it is possible to select an appropriate display content according to the size of the display area of the display 10 and display the gesture operation result via the selected content.

The display execution unit 74 displays an icon when the gesture operation result is displayed using the head-up display 11, and displays detailed information when the gesture operation result is displayed using the display unit 13. In other words, the display execution unit 74 displays an icon when the gesture operation result is displayed using the small display, and displays detailed information when the gesture operation result is displayed using the large display. Therefore, since the head-up display 11 is smaller in display area and is likely to be lower in resolution than the display unit 13, it is possible to simplify the content displayed on the head-up display 11. Therefore, it is easy to reduce a frequency of occurrence of a situation in which the display of the gesture operation result displayed on the head-up display 11 is too complicated to be visually recognized by the operator.

When the center information display 13c and the infotainment display 13i are included in the vision area VA, the display execution unit 74 displays the gesture operation result on the center information display 13c. In other words, when the center information display 13c is included in the vision area VA (YES in step S131), the display execution unit 74 displays the gesture operation result on the center information display 13c in priority to the other displays. Here, the center information display 13c includes the touch panel that functions as the gesture detector 53. Therefore, it is easy to correct the operation of the operation target device by additionally performing a gesture after confirming the gesture detection result.

When the vehicle is stopped (YES in S112), the display execution unit 74 displays the gesture operation result on the center information display 13c regardless of the positional relationship between the vision area VA and the display area. Therefore, in a situation where the center information display 13c can be easily visually recognized, the gesture operation result can be displayed on the center information display 13c regardless of the line of sight of the operator. Therefore, the time required from the performance of the gesture to the display of the gesture operation result can be easily shortened. The center information display 13c includes the touch panel. Therefore, it is easy to correct the operation of the operation target device by additionally performing the touch operation after confirming the gesture detection result.

When the display area is not included in the vision area VA (NO in step S122), the display execution unit 74 does not display the gesture operation result using the display 10 and outputs the gesture operation result from the speaker 21 as a sound. Therefore, unnecessary display in a display area that is not visually recognized by the operator can be reduced, and the gesture operation result can be notified by sound. Therefore, as compared to a case where the notification of the gesture operation result is suspended until the display area is included in the vision area VA, it is easy to quickly notify the operator of the gesture operation result. Therefore, it is easy to prevent the operator from misunderstanding that the operation by the gesture is not received.

In the display execution step, the display mode of the gesture operation result is determined based on the positional relationship between the vision area VA and the display area. Therefore, it is easy to appropriately respond to a gesture of the operator as compared with a case where display is always executed in the same manner regardless of the position of the vision area VA that may change depending on the situation of the operator. Therefore, it is easy for the operator to grasp whether the operation by the gesture is appropriately reflected in the control of the operation target device. Therefore, it is possible to provide a display control method that is easy to operate using a gesture.

Second Embodiment

This embodiment is a modification of the basic preceding embodiment. In this embodiment, when one of display screens of electronic mirrors 15 is included in a vision area VA, display of the gesture operation result is stopped.

Figure 7:
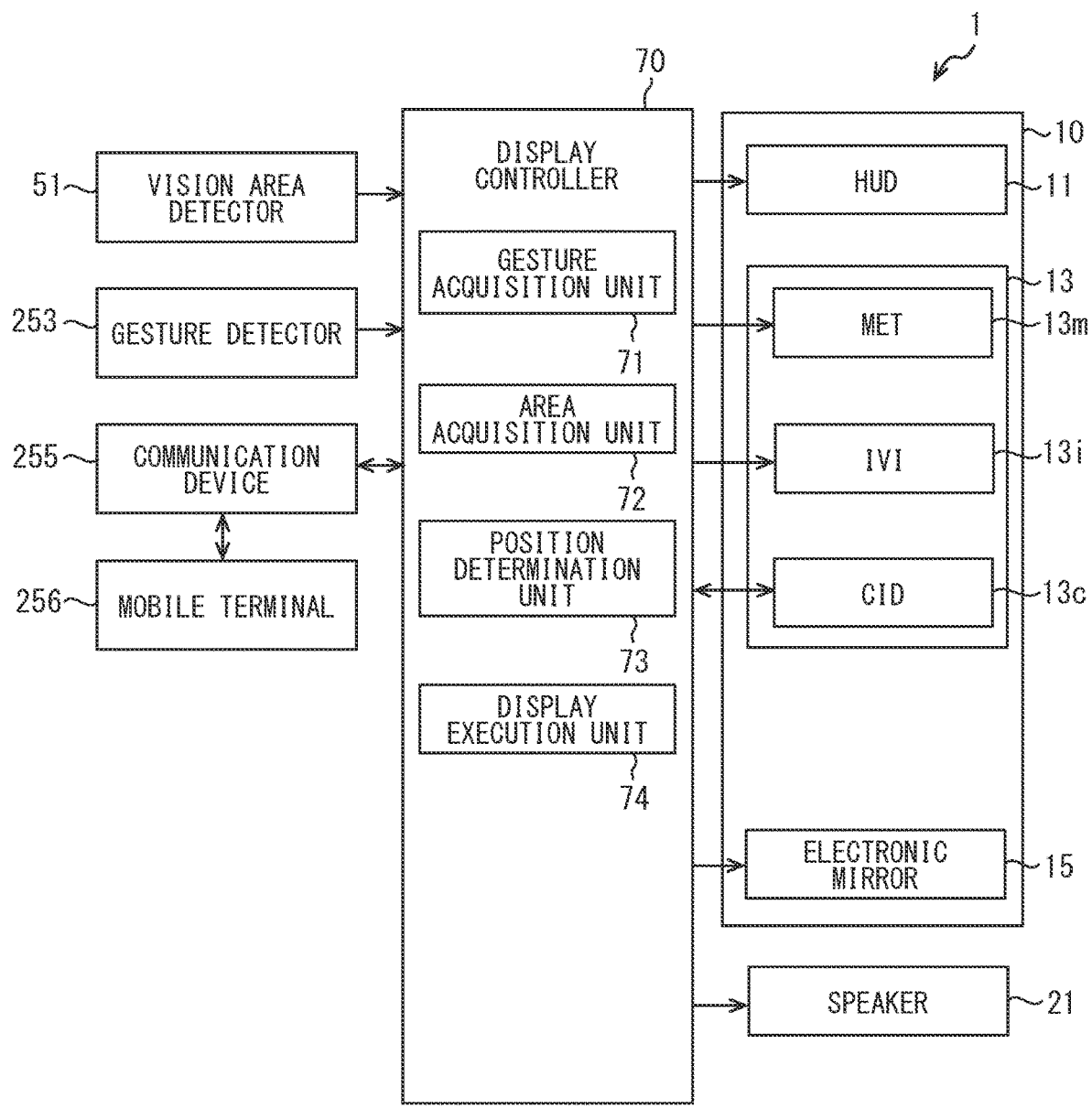
FIG. 7 is a block diagram related to control of a display system according to a second embodiment.

In FIG. 7, a display controller 70 is connected to a gesture detector 253. The gesture detector 253 includes an in-vehicle camera that captures an image of an occupant, and detects a gesture from the captured motion of the occupant. The display controller 70 acquires the gesture detected using the gesture detector 253.

The display controller 70 is connected to a communication device 255. The communication device 255 enables communication between a mobile terminal 256 carried by the occupant and the display controller 70. The display controller 70 performs necessary display related to the mobile terminal 256 via the communication device 255. For example, the display controller 70 displays on the display 10 that there is an incoming call to the mobile terminal 256, and provides the occupant with a proposal to start a hands-free call.

Figure 8:
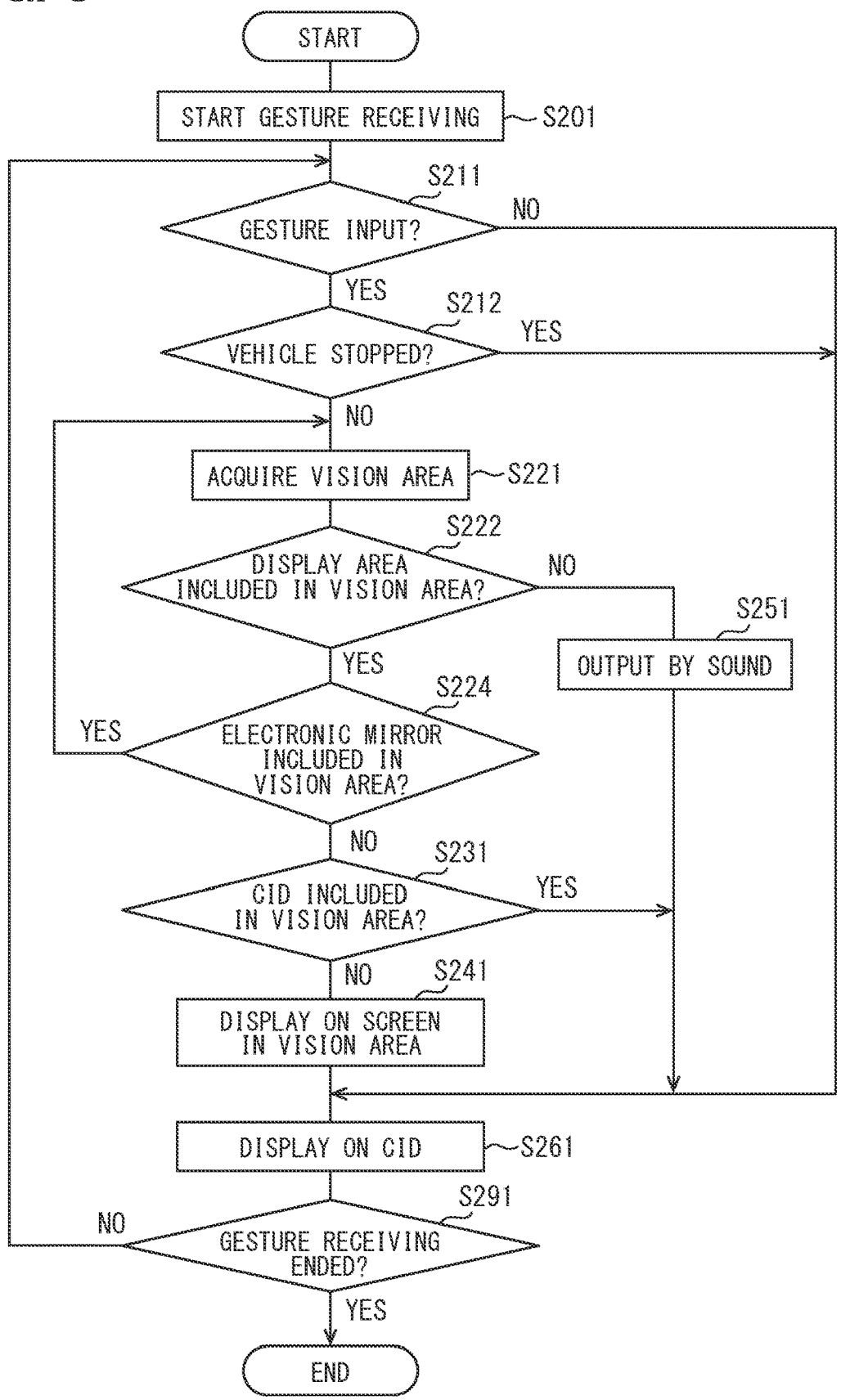
FIG. 8 is a flowchart illustrating the control of the display system according to the second embodiment.

A display control for a gesture will be described with reference to FIG. 8, in which a hands-free call using the mobile terminal 256 is taken as an example. The display control for a gesture is started, for example, when there is an incoming call to the mobile terminal 256. When the display control for a gesture is started, in step S201, the gesture detector 253 starts receiving a gesture performed by the occupant. At this time, a center information display 13c displays a message proposing to start a hands-free call. After the receiving of the gesture is started, the control proceeds to step S211.

In step S211, the display controller 70 determines whether there is an input of a gesture by the occupant. The gesture can be set as, for example, shaking the palm of a hand to the gesture detector 253. More specifically, shaking the palm in the up-down direction can be set as the gesture to start a hands-free call in response to the proposal of the hands-free call. On the other hand, shaking the palm in the right-left direction can be set as the gesture not to start a hands-free call.

When there is the gesture to start a hands-free call, the hands-free call is started and the process proceeds to step 212. When there is the gesture not to start a hands-free call, the call is rejected and the process proceeds to step 212. On the other hand, when there is no gesture for a certain period of time, the process proceeds to step 261.

In step S212, the display controller 70 determines whether the vehicle is stopped. When the vehicle is determined not to be stopped, i.e., determined to be traveling in step S212, the control proceeds to step S221. On the other hand, when the vehicle is determined to be stopped in step S212, the process proceeds to step S261.

In step S221, an area acquisition unit 72 acquires the vision area VA of the driver. The area acquisition unit 72 also acquires a display area. After the vision area VA and the latest display area are acquired, the control proceeds to step S222. The control in step S221 provides an example of an area acquisition step.

In step S222, the position determination unit 73 determines whether the display area is included in the vision area VA. When even a part of the display area is determined to be included in the vision area VA in step S222, the control proceeds to step S224. On the other hand, when the display area is determined not to be included in the vision area VA in step S222, it is determined that the driver cannot immediately visually recognize information displayed by the display 10, and the control proceeds to step S251. The control of step S222 provides an example of a position determination step.

Figure 9:
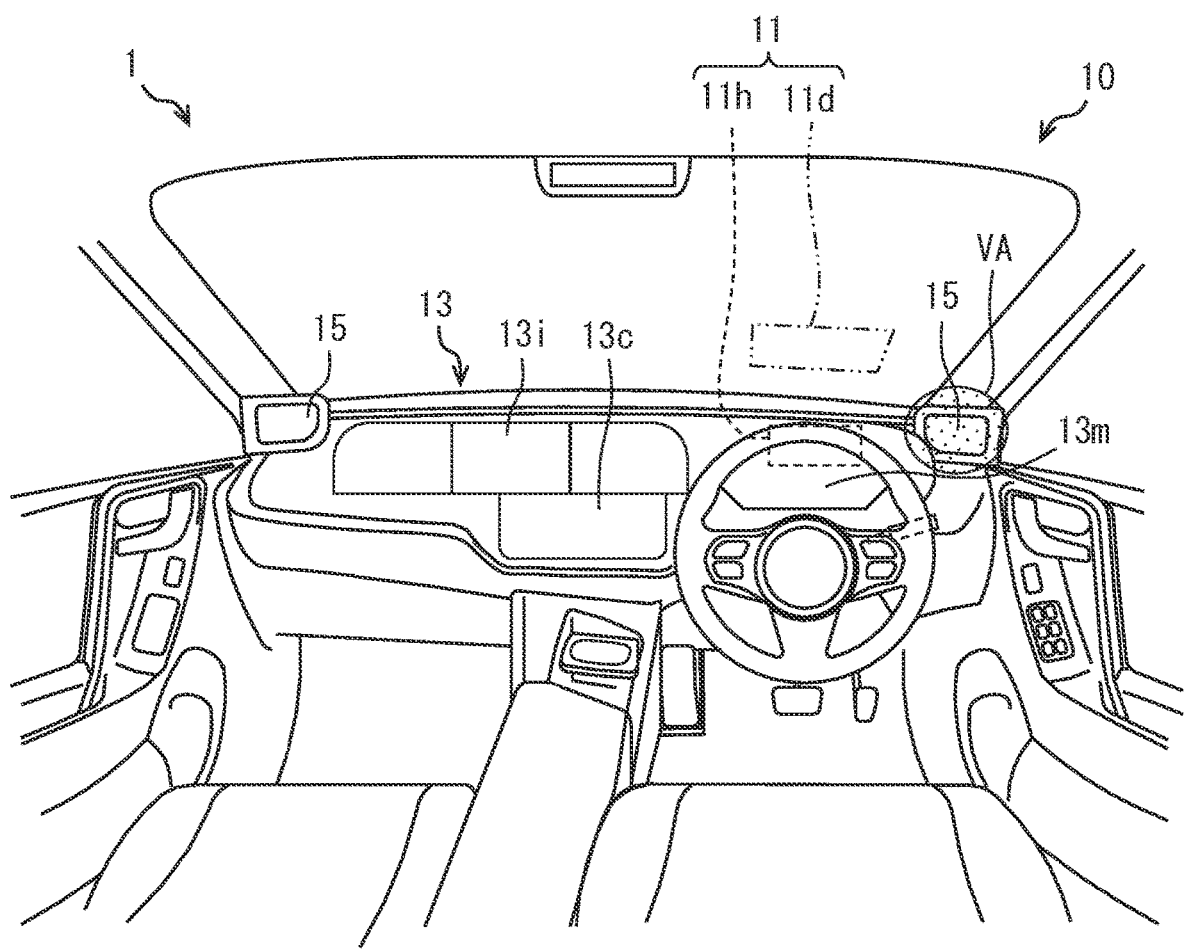
FIG. 9 is a diagram illustrating a vision area of the driver looking at an electronic mirror.

In step S224, the position determination unit 73 determines whether one of the display screens of the electronic mirrors 15 is included in the vision area VA. FIG. 9 shows the vision area VA when the driver is gazing at a right electronic mirror 15. The center position of the vision area VA is located on the display screen of the electronic mirror 15. The display area included in the vision area VA is only the display screen of the electronic mirror 15. The control of step S224 provides an example of a position determination step.

When the display screen of the electronic mirror 15 is included in the vision area VA, it can be assumed that the driver is particularly concentrated on driving. Therefore, the process returns to step S221 without displaying on the display screen of the electronic mirror 15. As a result, the display of the gesture operation result is stopped until the driver visually recognizes the display area other than the electronic mirror 15 or the display area is no longer included in the vision area VA. On the other hand, when the display screen of the electronic mirror 15 is determined not to be included in the vision area VA in step S224, the process proceeds to step S231.

In step S231, the position determination unit 73 determines whether the display screen of the center information display 13c is included in the vision area VA. When the center information display 13c is determined to be included in the vision area VA in step S231, the control proceeds to step S261. On the other hand, when the display screen of the center information display 13c is determined not to be included in the vision area VA in step S231, the control proceeds to step S241. The control of step S231 provides an example of a position determination step.

In step S241, the display execution unit 74 displays the gesture operation result on the display screen included in the vision area VA. For example, when the vision area VA is located on the display portion 11d of the head-up display 11, the gesture operation result is displayed as an icon on the display portion 11d. Here, the icon is a display indicating that the hands-free call is in progress or a display indicating that the call is rejected.

For example, when the vision area VA is located on the display screen of the meter display 13m, the gesture operation result is displayed as an icon on the display screen of the meter display 13m. For example, when the vision area VA is located on a right portion of the infotainment display 13i, the gesture operation result is displayed as the icon on the right portion of the infotainment display 13i. After the icon of the gesture operation result is displayed on the display screen in the vision area VA in step S241, the control proceeds to step S261. The control of the step S241 provides an example of a display execution step.

In step S251, the display execution unit 74 outputs the gesture operation result by sound. For example, notification of the start of the hands-free call is output from the speaker 21 as a notification sound. Alternatively, notification of the rejection of the call is output from the speaker 21 as a notification sound. After outputting the gesture operation result by sound at S251, the control proceeds to step S261.

In step S261, the display execution unit 74 displays the gesture operation result on the center information display 13c. The center information display 13c displays detailed information instead of an icon. When the hands-free call is started, the detailed display includes, for example, information on the other party of the hands-free call and information on the elapsed time from the start of the hands-free call. When the hands-free call is not started, the detailed display includes, for example, information on the other party of the call and information on the time when the call is received. This case where the hands-free call is not started includes both a case where the hands-free call is rejected by the gesture and a case where the gesture is not performed. After the detailed information is displayed on the center information display 13c in step S261, the control proceeds to step S291. The control of the step S261 provides an example of a display execution step.

In step S291, the display controller 70 determines whether the receiving of the gesture has ended. When the receiving of the gesture has ended, it is determined that there is no possibility that a new gesture is input by the occupant, and the display control for the gesture ends. On the other hand, when the receiving of the gesture is maintained, it is determined that there is a possibility that a new gesture is input by the occupant, and the control returns to step S211 to repeat the series of display controls for the gesture.

The following will describe technical effects of the present embodiment. According to the embodiment described above, when the electronic mirror 15 corresponds to the display area included in the vision area VA, the display execution unit 74 suspends the display of the gesture operation result until the electronic mirror 15 is no longer included in the vision area VA. Therefore, the gesture operation result can be prevented from being displayed in a situation where the driver is presumed to concentrate on driving.

Although the air conditioner or the mobile terminal 256 via the communication device 255 has been described as an example of the operation target device of the operation by gesture, the operation target device is not limited to the example described above. For example, a car navigation device or an in-vehicle lighting device may be used as an operation target device, and the control of the volume of route guidance or illuminance may be configured to be operable by a gesture.

The disclosure in this specification, the drawings, and the like is not limited to the exemplified embodiments. The disclosure encompasses the illustrated embodiments and variations based on the embodiments by those skilled in the art. For example, the present disclosure is not limited to the combinations of components and/or elements shown in the embodiments. The disclosure may be implemented in various combinations. The disclosure may have additional members which may be added to the embodiments. The disclosure encompasses omission of components and/or elements of the embodiments. The disclosure encompasses the replacement or combination of components and/or elements between one embodiment and another. The disclosed technical scope is not limited to the descriptions of the embodiments.

The controller and the method described in the present disclosure may be implemented by a special purpose computer configuring a processor programmed to perform one or more functions embodied by a computer program. Alternatively, the apparatuses and methods described in this application may be fully implemented by special purpose hardware logic circuits. Further alternatively, the apparatuses and methods described in this application may be implemented by a special purpose computer created by a combination of a processor executing computer programs coupled with hardware logic circuits. The computer program may be stored in a computer-readable non-transition tangible storage medium as an instruction executed by a computer.

What is claimed is:

1. A display system configured to change display in accordance with a gesture of an operator in a vehicle, the display system comprising:
    a gesture detector configured to detect the gesture;
    a vision area detector configured to detect a vision area of the operator;
    a display configured to display a gesture operation result that is an operation result of the gesture; and
    a display controller configured to execute a control related to display processing of the display, wherein
    the display includes a center information display having a touch panel capable of receiving a touch operation, and
    the display controller includes a processor configured to:
        acquire the vision area detected by the vision area detector and a display area of the display,
        determine a positional relationship between the vision area and the display area, and
        display the gesture operation result to the operator,
        determine a display mode of the gesture operation result based on the positional relationship between the vision area and the display area, and
        display the gesture operation result on the center information display regardless of the positional relationship between the vision area and the display area when the vehicle is stopped.

2. The display system according to claim 1, wherein
    the display includes an electronic mirror for monitoring surroundings of the vehicle, and
    the processor is further configured to stop the display of the gesture operation result until the electronic mirror is no longer included in the vision area when the electronic mirror has the display area included in the vision area.

3. A display system configured to change display in accordance with a gesture of an operator in a vehicle, the display system comprising:
    a gesture detector configured to detect the gesture;
    a vision area detector configured to detect a vision area of the operator;
    a display configured to display a gesture operation result that is an operation result of the gesture; and
    a display controller configured to execute a control related to display processing of the display, wherein
    the display includes an electronic mirror for monitoring surroundings of the vehicle, and
    the display controller includes a processor configured to
        acquire the vision area detected by the vision area detector and a display area of the display,
        determine a positional relationship between the vision area and the display area, and
        display the gesture operation result to the operator,
        determine a display mode of the gesture operation result based on the positional relationship between the vision area and the display area, and
        stop the display of the gesture operation result until the electronic mirror is no longer included in the vision area when the electronic mirror has the display area included in the vision area.

4. The display system according to claim 1, wherein
    the processor is further configured to display the gesture operation result in the display area within the vision area when at least a part of the display area is included in the vision area, and the processor is further configured not to display the gesture operation result in the display area when the display area is not included in the vision area.

5. The display system according to claim 4, wherein
    the display is capable of displaying the gesture operation result at an arbitrary position in the display area, and
    the processor is further configured to display the gesture operation result at a position including a center position of the vision area.

6. The display system according to claim 4, wherein
    the display includes display sections capable of displaying the gesture operation result, and
    the processor is further configured to display the gesture operation result in a display section located at a position closest to a center position of the vision area among the display sections.

7. The display system according to claim 1, wherein
    the display includes
        a small display, and
        a large display larger in display area than the small display, and
    the processor is further configured to display different contents between a case of displaying the gesture operation result on the small display and a case of displaying the gesture operation result on the large display.

8. The display system according to claim 7, wherein
    the small display is capable of displaying a virtual image superimposed on a front window of the vehicle,
    the large display includes display screens provided on an instrument panel and arranged next to each other,
    the processor is further configured to display an icon when the gesture operation result is displayed using the small display, and
    the processor is further configured to display detailed information when the gesture operation result is displayed using the large display.

9. The display system according to claim 8, wherein
    the large display includes a center information display having a touch panel as one of the display screens, which functions as the gesture detector, and
    the processor is further configured to display the gesture operation result on the center information display in priority to others of the display screens when the center information display is included in the vision area.

10. The display system according to claim 1, further comprising
    a speaker configured to output sound into the vehicle, wherein
    the processor is further configured to output the gesture operation result from the speaker as sound without displaying the gesture operation result using the display when the display area is not included in the vision area.

* * * * *